Figure 1:
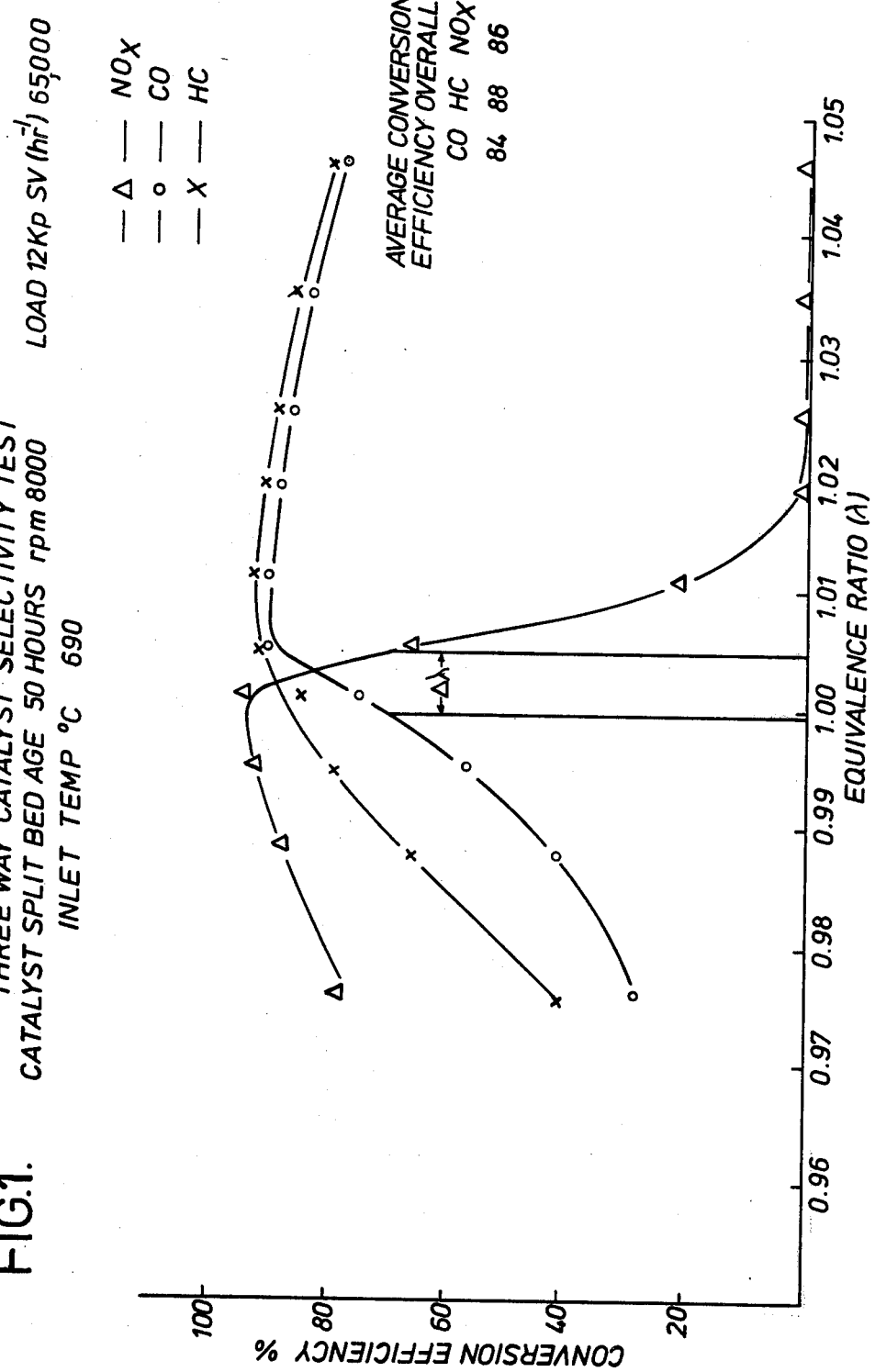

United States Patent [19]

Harrison et al.

[11] 4,127,510
[45] Nov. 28, 1978

[54] CATALYST FOR THE PURIFICATION OF AN EXHAUST GAS

[75] Inventors: Brian Harrison, Watlington; Alan F. Diwell, Reading, both of England

[73] Assignee: Johnson, Matthey & Co., Limited, London, England

[21] Appl. No.: 735,884

[22] Filed: Oct. 26, 1976

[30] Foreign Application Priority Data

Oct. 31, 1975 [GB] United Kingdom ............ 45493/75
Jun. 18, 1976 [GB] United Kingdom ............ 25370/76

[51] Int. Cl.$^2$ .................... B01J 21/04; B01J 23/10; B01J 23/58; B01J 23/74
[52] U.S. Cl. ............................ 252/462; 252/466 B; 252/466 PT; 252/473; 423/213.2; 423/213.5
[58] Field of Search ............. 252/462, 466 PT, 473, 252/466 B; 423/213.5, 213.7, 600

[56] References Cited

U.S. PATENT DOCUMENTS

| 3,711,397 | 1/1973 | Martinsons | 423/600 X |
| 3,773,894 | 11/1973 | Bernstein et al. | 252/474 X |
| 3,897,367 | 7/1975 | Lauder | 252/462 |
| 3,905,918 | 9/1975 | Mai et al. | 252/462 |
| 3,907,968 | 9/1975 | Kobylinski et al. | 423/213.5 |
| 3,972,837 | 8/1976 | Acres et al. | 252/473 |
| 4,001,143 | 1/1977 | McCann | 252/462 |

OTHER PUBLICATIONS

Galasso, "Structure, Properties and Preparation of Perovskite-Type Compounds", p. 21, (1969).

*Primary Examiner*—W. J. Shine
*Attorney, Agent, or Firm*—Cushman, Darby & Cushman

[57] ABSTRACT

This invention relates to catalysts suitable for the purification of exhaust gases. In particular a catalyst according to the invention comprises a compound selected from the group represented by the general formula $A_xM_yO_z$ in which A is one or more metals selected from the group consisting of Li, Na, K, Mg, Ca, Sr, Ba, Al, Sc, Y, the lanthanides, Ti, Zr, V, Cr, Mn, Fe, Co, Ni, Cu, Zn; M is a metal selected from the group consisting of Ir, Rh, Pt, Pd, and Ru; $y$ has an integral or fractional value within the range from 0.1 to 3.0, $z$ is an integer with a value from 2 to 7 and $x$ has a value such that the compound is electrically neutral.

3 Claims, 17 Drawing Figures

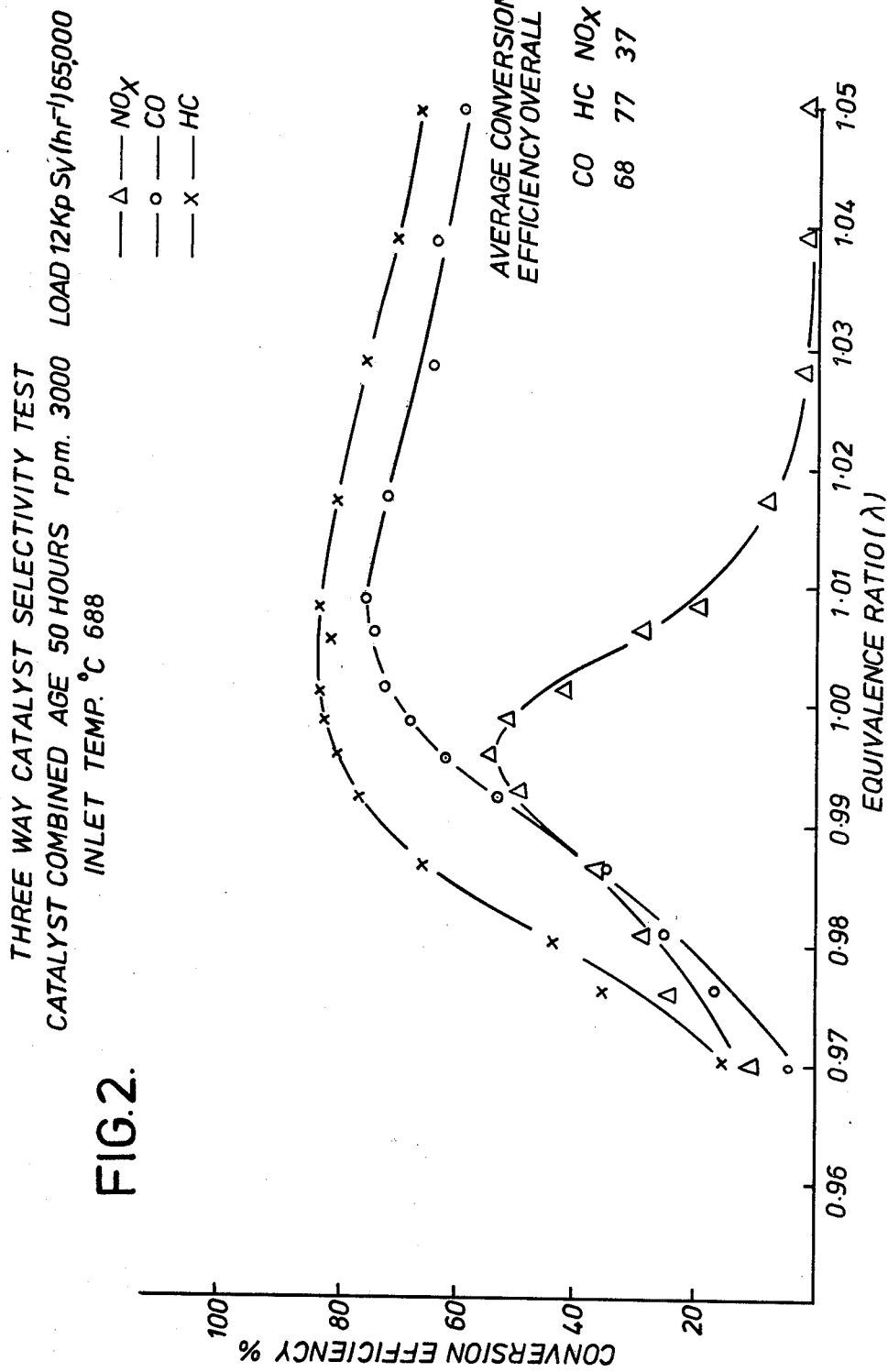

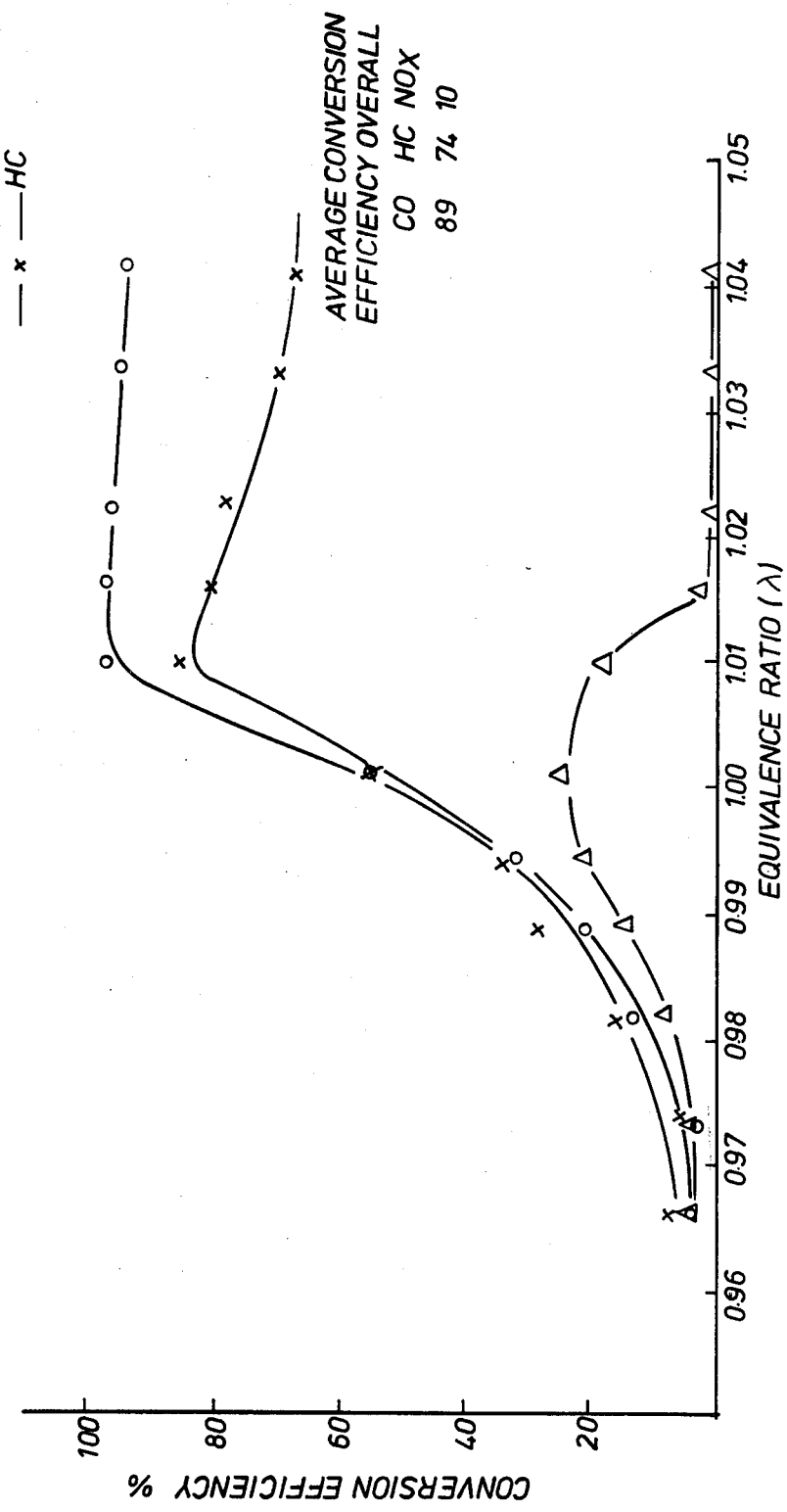

NO ADSORPTION BY RH COMPOUNDS

CATALYST FOR THE PURIFICATION OF AN EXHAUST GAS

This invention relates to catalysis; more particularly, it relates to catalytic reactions which are useful in exhaust gas purification, especially where the exhaust gases contain one or more oxides of nitrogen and a stoichiometric excess of oxygen.

In the purification of automobile exhaust gases two separate catalytic stages are frequently envisaged: firstly a reduction stage in which the unreacted hydrocarbon and carbon monoxide components reduce the oxides of nitrogen to nitrogen and water in the presence of a reduction catalyst and secondly, after the admission of air through a secondary air intake, an oxidation stage in which any unreacted hydrocarbon and carbon-monoxide are oxidised to carbon dioxide and water in the presence of an oxidation catalyst.

Alternatives to this envisage controlled fuel injection into the engine in such a way that stoichiometric conditions are operative substantially all the time. Exhausts from such engines may also be treated by the dual bed concept as described above or by use of a single combined bed in which either (a) an oxidation and a reduction catalyst are deposited on separate supports within a single catalyst unit with no secondary air intake, or (b) oxidation and reduction catalysts are simultaneously deposited upon the same catalyst support in such a way that they form a mixture on the surface of the support which subsequently exhibits combined beneficial oxidation and reduction properties.

Platinum is a known oxidation catalyst and platinum-rhodium alloys are known to be useful for reduction of oxides of nitrogen, particularly when supported upon a high surface area refractory ceramic or metallic honeycomb ultimate support.

One disadvantage of this type of supported rhodium-platinum alloy catalyst is that although the ratio of the two metals present is carefully selected for most effective catalysis under operating conditions, the surface of the alloy tends to become Rh-enriched by migration of the rhodium component in the alloy.

It is an object of the present invention to provide catalysts in which such enrichment does not occur.

It is a further object of the invention to provide catalysts which will remove oxides of nitrogen under oxidising conditions. Such catalysts would avoid the aforementioned disadvantages of requiring either two separate catalytic stages or controlled fuel injection.

According to one aspect of the present invention, a catalyst for the purification of automobile exhaust gases comprises a compound selected from the group represented by the general formula $A_xM_yO_z$ in which A is one or more metals selected from the group consisting of Li, Na, K, Mg, Ca, Sr, Ba, Al, Sc, Y, the lanthanides, Ti, Zr, V, Cr, Mn, Fe, Co, Ni, Cu, Zn; M is a metal selected from the group consisting of Ir, Rh, Pt, Pd and Ru; $y$ preferably has the value 1 or 2 but may be fractional and range from 0.1 to 3.0, $z$ is an integer with a value from 2 to 7 and $x$ has a value such that the compound is electrically neutral.

Examples of compounds according to the general formula defined above are $LaRhO_3$, $BaRuO_3$, $MgRh_2O_4$, $Ba_4PtO_6$, $CoAlRhO_4$, $CaPD_3O_4$ and $LaNa_{0.5}Ir_{0.5}O_3$. Of these examples, those in which $x$ and $y$ have a value of 1 and $z$ in the general formula $A_xM_yO_z$, have the perovskite has a value of 3 structure whereas the remainder are spinels.

According to another aspect of the present invention, a process for the purification of an exhaust gas which includes the simultaneous reduction of an oxide of nitrogen, in the presence or absence of a gaseous fuel, and the oxidation of carbon monoxide and one or more organic compounds in the presence of oxygen can be effected by passage of said gases through a supported catalyst comprising a support which is impregnated or coated with a compound having a general formula selected from the group consisting of $A_xM_yO_z$ in which A, M, $x$, $y$ and $z$ are as defined above. In this aspect of the invention the support is preferably an inert material in the form of a unitary porous refractory ceramic or metallic honeycomb or similar structure, but may be particulate, for example in the form of granules. Preferably also, the inert material has an intermediate layer of a high surface area refractory metal oxide and one or more of the compounds $A_xM_yO_z$ is deposited upon the said intermediate layer. If desired, the support may be made from a metal or alloy, for example KANTHAL DSD foil supplied by the Kanthal Company of Sweden.

In the operation of this invention we have sometimes found it desirable to deposit an oxidation catalyst such as platinum either on the same support or on a separate support in the same catalyst bed, so that under stoichiometric conditions oxidation of CO and hydrocarbons and reduction of NOX proceeds at the same time in one bed. However, depending on the actual catalyst used, it is not always desirable to deposit a separate oxidation catalyst since some catalysts according to the invention not only oxidise hydrocarbons and carbon monoxide but also remove oxides of nitrogen under oxidising conditions.

Preferably the inert material may have a first deposit of a refractory metal oxide which is itself then impregnated or coated with $A_xM_yO_z$ and/or Pt. Suitably the ratio of M to Pt deposited considered as weight of metal alone is within the range 1–50% by weight with preferred M concentrations in the range 5–10% by weight.

The inert structure used in the process of the present invention and upon which the refractory metal oxide is deposited may be particulate i.e. granular or pelletised but we prefer to use a unitary rigid honeycomb structure of the ceramic type (see Talsma U.S. Pat. No. 3,255,027) or of the metallic type (see Heathcote et al German DOS No. 2,450,664) having a corrugated cellular form (see Corning British Pat. No. 882,484). Alternatively the inert support may simply have macropores or channels extending throughout the length of its body in the direction of gas flow.

The refractory metal oxide is deposited on the support (either continuously or discontinuously) and preferably the deposit is in the form of a film of from 0.0004 to 0.001 inches thick.

Such an oxide is a calcined refractory metal oxide which itself is characterised by a porous structure and which possesses a large internal pore volume and total surface area and is therefore referred to as an "active" (i.e. catalytically active) refractory metal oxide.

The preferred active refractory metal oxides contain members of the gamma or activated alumina family which can be prepared, for instance, by precipitating a hydrous alumina gel and, thereafter, drying and calcining to expel water of hydration and provide the active gamma-alumina. A particularly preferred active refractory metal oxide is obtained by drying and calcining at temperatures of 300° C. and 800° C. a precursor mixture of hydrous alumina phases predominating in crystalline trihydrate, that is, containing in excess of 50% by weight of the total alumina hydrate composition, preferably from 65% to 95% by weight of one or more of the trihydrate forms gibbsite, bayerite and nordstrandite by X-ray diffraction.

Other suitable active refractory metal oxides include, for example, active or calcined beryllia, zirconia, magnesia or silica, and combinations of metal oxide such as boria-alumina or silica-alumina. Preferably the active refractory oxide is composed predominantly of oxides of one or more metals of Groups II, III and IV of the Periodic Table. The active refractory metal oxide deposits may constitute from 1 to 50 weight percent of the unitary support, preferably from 5 to 30 percent.

The active refractory metal oxide of the present invention may be deposited on the support in several ways. One method involves dipping the support into a solution of the salt of the refractory metal and calcining to decompose the salt to the oxide form. Another and preferred method comprises dipping the support into an aqueous suspension, dispersion or slurry of the refractory oxide itself, drying and calcining. This method is known in the art (see Houdry, British Pat. No. 690825).

In alternative methods the preferred refractory oxide is a transitional alumina which may be dispersed in colloidal aluminium hydroxide stabilised with nitric acid prior to dipping the support as above or alumina may be deposited onto the inert support from alkaline sodium aluminate solution. In these methods suspension or dispersions can be used to deposit a suitable amount of a refractory metal oxide on the support in a single application.

EXAMPLES 1-3

In these examples three different catalyst systems for automobile exhaust purification were compared. All three were deposited upon a metal support; Kanthal DSD foil 0.002 inches thick supplied by the Kanthal Company, Sweden. The foil was made up into two pieces of corrugated honeycomb 3 inches long and 4 inches in diameter having 400 cells per square inch. Loading of precious metal in all cases amounted to a total of 40 grams per cubic ft. of support.

EXAMPLE 1

(a) Split Bed

A split bed catalyst system was constructed having a first oxidation catalyst consisting of platinum metal deposited by known methods upon an alumina washcoated monolithic metal support described above and a second reduction catalyst consisting of a separate washcoated metallic monolith having LaRhO$_3$ deposited from lanthanum nitrate and rhodium nitrate solutions. The mixed solutions were used to impregnate the support which was then dried and fired at 650° C. The alumina washcoat contained 5% by weight of barium (present as the oxide) as stabilizer. Loadings were as follows:

Loading of Pt on 1st monolith . . . 74 gm per cu ft.
Loading of Rh on 2nd monolith . . . 6 gm per cu ft.
The formation of LaRhO$_3$ was confirmed by X-ray diffraction analysis.

This catalyst was exposed to an exhaust gas from a VW 1.7 liter "flat four" air cooled engine fitted with the Bosch 'D' jetronic fuel injection system, with manual control, enabling the air fuel ratio to be varied in small steps from rich to lean tune (usually 14.2-15.5). At each mixture setting, the conversion efficiencies of CO, HC and NOx were measured.

The catalyst was then subjected to a 50 hour ageing cycle in the exhaust of a 1.8 liter British Leyland Dolomite engine. The cycle consisted of 1 minute at idle, and 1 minute at 360 rpm (equivalent to 70 m.p.h.). Thus an average speed of 35 m.p.h. was maintained. A relay operated solenoid valve was used to direct the air intake for half of each cycle, so that the catalyst experienced a reducing atmosphere for 30 seconds of each cycle, and oxidising conditions for the remaining 30 seconds.

The air-equivalence ratio ($\lambda$) range experienced on this cycle is as follows:
Idle with air $\lambda$ = 1.10; CO % = 5-6%
Idle without air $\lambda$ = 0.73; CO % = 8-9%
3600 rpm with air $\lambda$ = 1.15; CO % = 2.3-2.5%
3600 rpm without air $\lambda$ = 0.86; CO % = 2.8-3.0%

After this ageing cycle, the catalyst was retested on the VW 1.7 liter engine and the results obtained for varying equivalence ratios are given in FIG. 1.

EXAMPLE 2

(b) Combined Bed.

In this example both the Pt and LaRhO$_3$ were deposited on the same monolith. The combined Pt and Rh loading was still 40 gm. per cu ft. and the same type of alumina washcoated metallic monolith was used as support. Again readings were taken after ageing for 50 hours. Results are shown in FIG. 2.

EXAMPLE 3

(c) Alloy

This example is not one of the present invention but of the prior art catalysts and is included for comparative purposes only. Again using a washcoat and support of the same type a 7½% Rh/Pt alloy was deposited at a loading of 40 gm. of platinum group metal per cubic foot of support. Results after ageing of the catalyst for 50 hours are shown in FIG. 3.

| | Comparison of Results. | | |
|---|---|---|---|
| | Average Conversion Efficiency (overall percentages) | | |
| | CO | HC | NOx |
| Split bed | 84 | 88 | 86 |
| Combined | 68 | 77 | 37 |
| Alloy (comparison) | 89 | 74 | 10 |

It can be seen that for hydrocarbon and for NOx conversion, especially the latter, results are appreciably better than for the prior art catalysts. For carbon monoxide conversion the split bed catalyst is nearly as good as 7½% Rh/Pt alloy. Overall the presence of Rh as LaRhO$_3$ must be considered to be a considerable improvement when used as a "three-way" catalyst.

EXAMPLES 4-9

In these examples, seven different catalysts according to the invention for automobile exhaust purification were compared. All were deposited on or associated with an inert particulate support of a refractory oxide, without an intermediate catalytically active refractory oxide. The inert refractory oxide selected was "Davison 70" silica. In each example, 0.1 g of catalyst was associated with sufficient silica to make a total weight of 1g. Each catalyst was then tested in a simulated exhaust stream at a fixed value of R (where R is the ratio of oxidising to reducing species in the inlet gas stream and is calculated according to the equation $$(R = 2 \times \%O_2 + \%NOx/\%CO)$$

and with varying catalyst inlet temperature; the catalyst was then tested at the optimum temperature for removal of nitrogen oxides, as determined from the first run, varying the value of R.

The composition of the feed gas was nitric oxide in $N_2$, 1900 v.p.m.; carbon monoxide, 3%; oxygen, 2.76% at R = 1.9 (varied for different R values). The space velocity through the supported catalyst was 22,000 $hr^{-1}$, calculated on the weight of actual catalytic material.

Figure 4A:
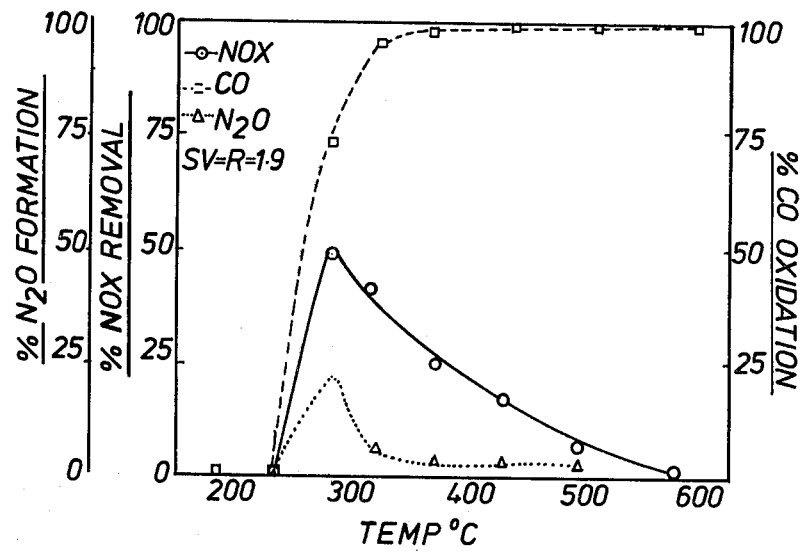
Figure 4B:
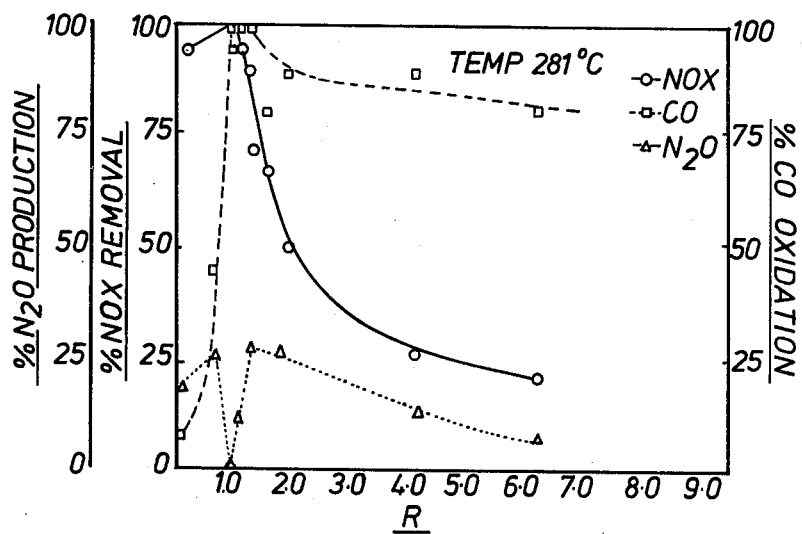
Figure 5A:
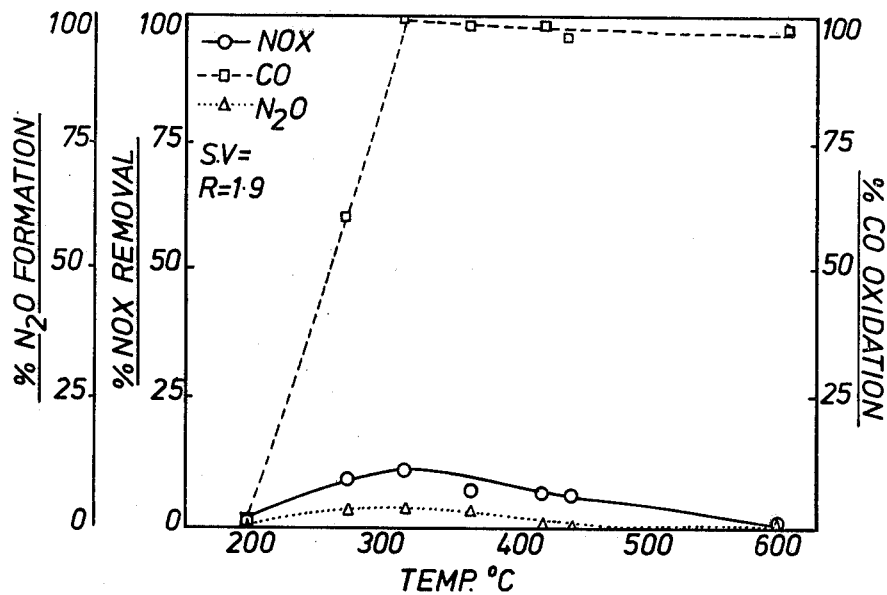
Figure 5B:
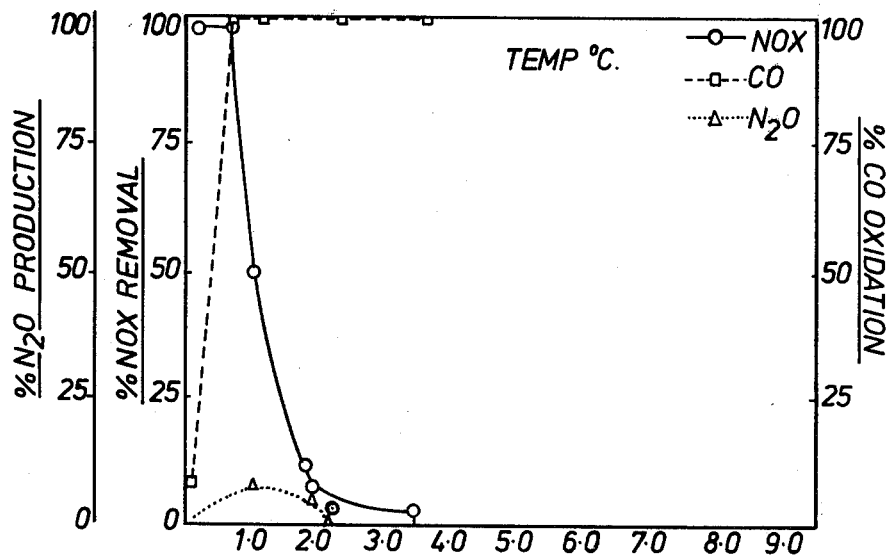
Figure 6A:
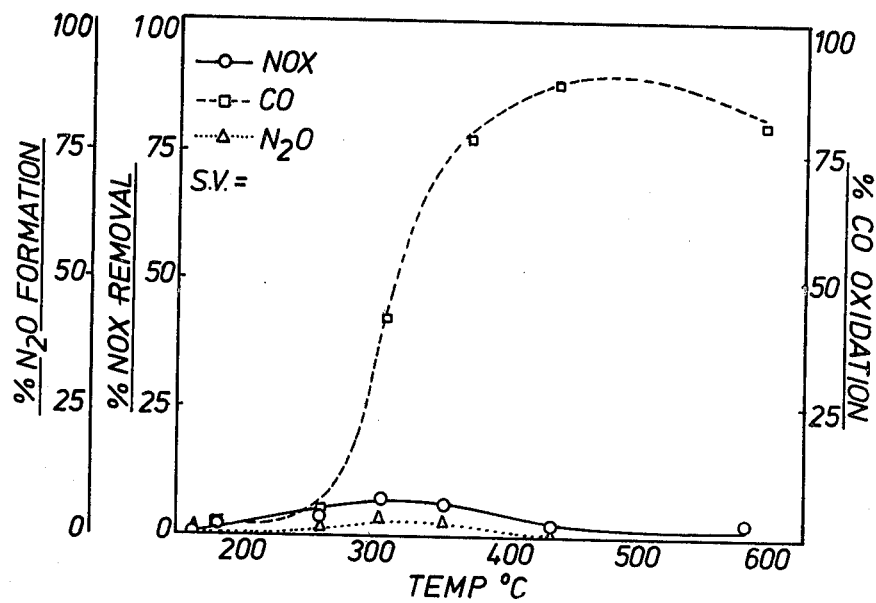
Figure 6B:
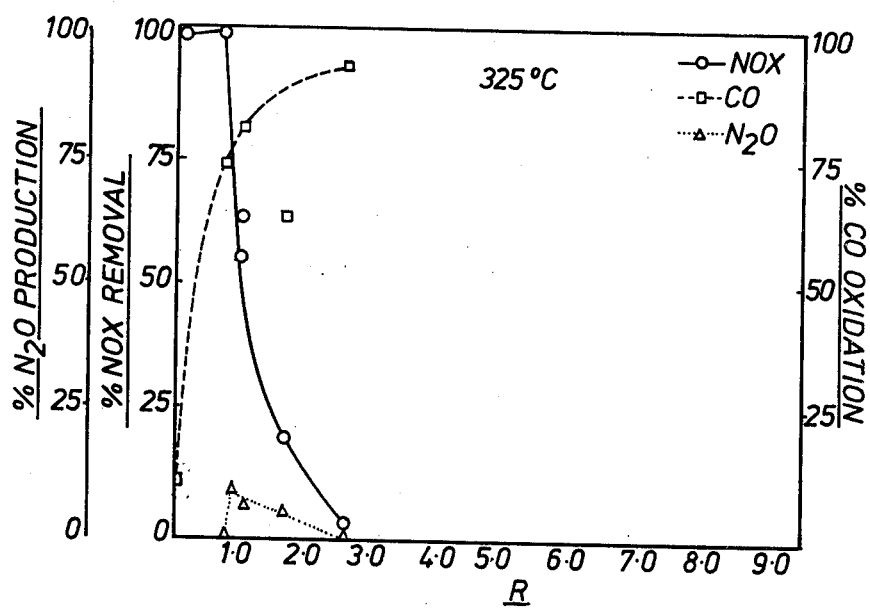

EXAMPLE 4 (See FIGS. 4a and 4b)

The catalyst evaluated in this example was $LaRhO_3$. FIG. 4a shows that, at R = 1.9, maximum NOx removal occurred at just below 300° C. The isothermal experiment at 281° C. (FIG. 4b) shows that this catalyst is reasonably resistant to oxygen poisoning.

EXAMPLES 5 and 6 (FIGS. 5a, 5b, 6a, 6b)

Catalysts $LaRuO_3$ and $BaRuO_3$ respectively were poor in comparison to both previous Examples for resistance to oxygen poisoning. In both cases, considering the isothermal experiments at 340° C. and 325° C. respectively, NOx removal was falling rapidly before the stoichiometric point (R=1) was reached.

Figure 7A:
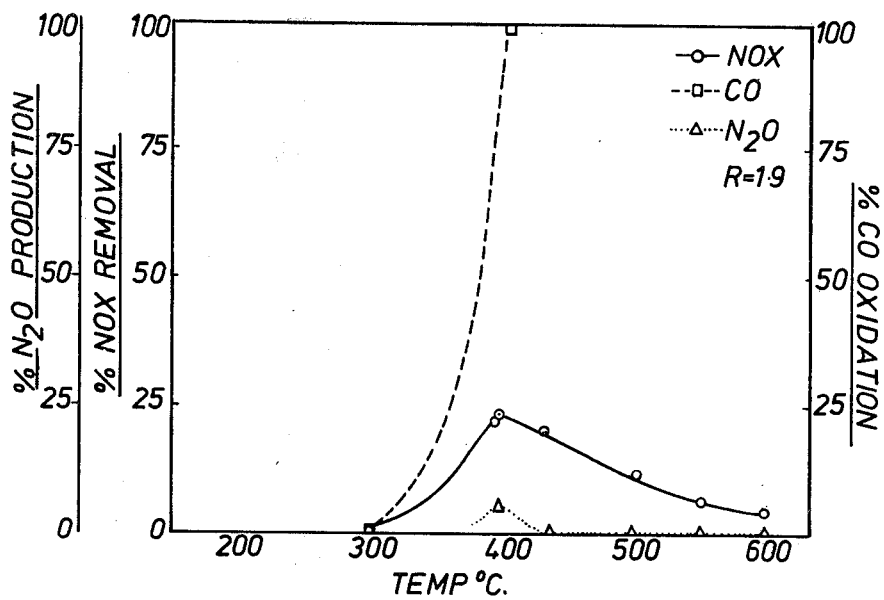
Figure 7B:
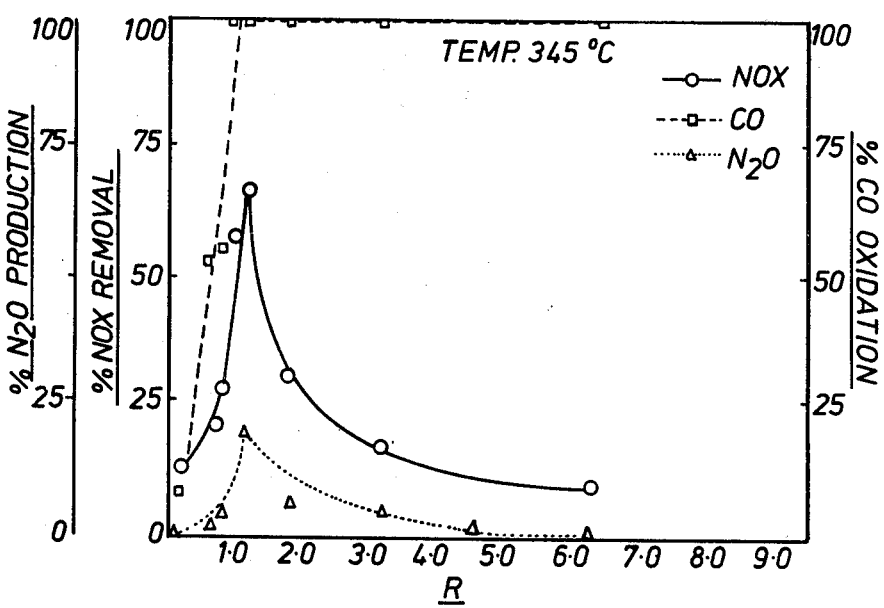

EXAMPLE 7 (FIGS. 7a and 7b)

Catalyst $Ba_4PtO_6$ is shown to have a certain measure of resistance to oxygen poisoning, retaining about 50% of its maximum activity in NOx removal at an R value of 2.

Figure 8A:
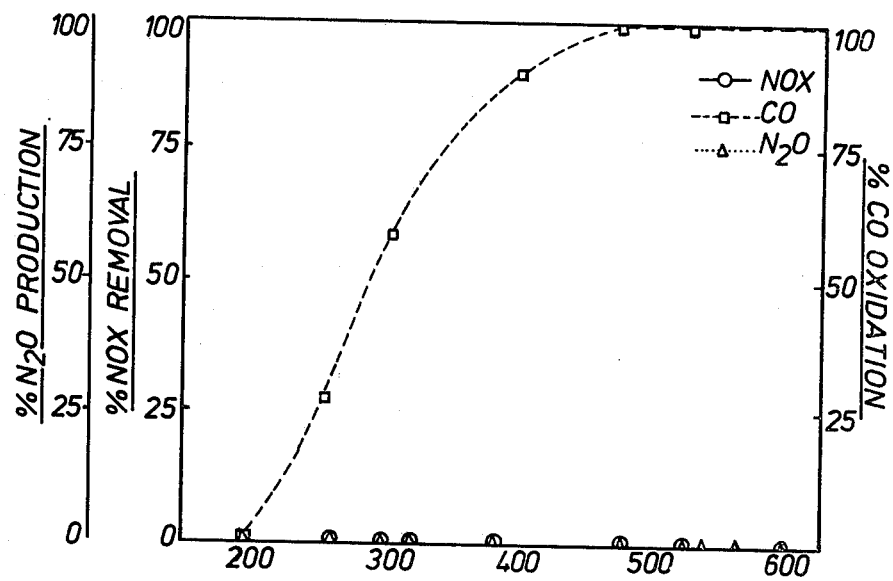
Figure 8B:
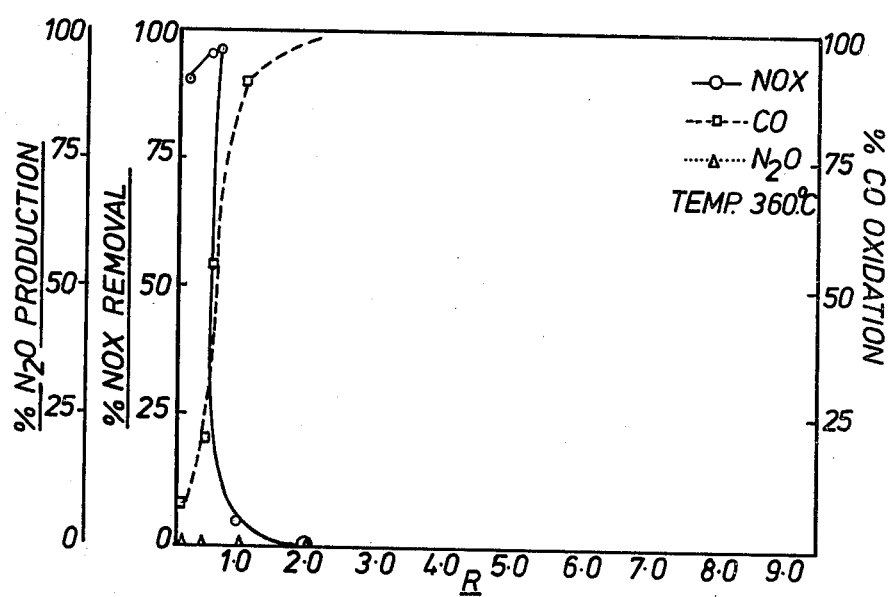

EXAMPLE 8 (FIGS. 8a and 8b)

The catalyst tested in this example was a complex having the formula $La_{0.8}Sr_{0.2}Co_{0.9}Ru_{0.1}O_3$. This catalyst was highly active in NOx removal under reducing conditions but at an R value of 1.9 NOx removal was zero.

Figure 9A:
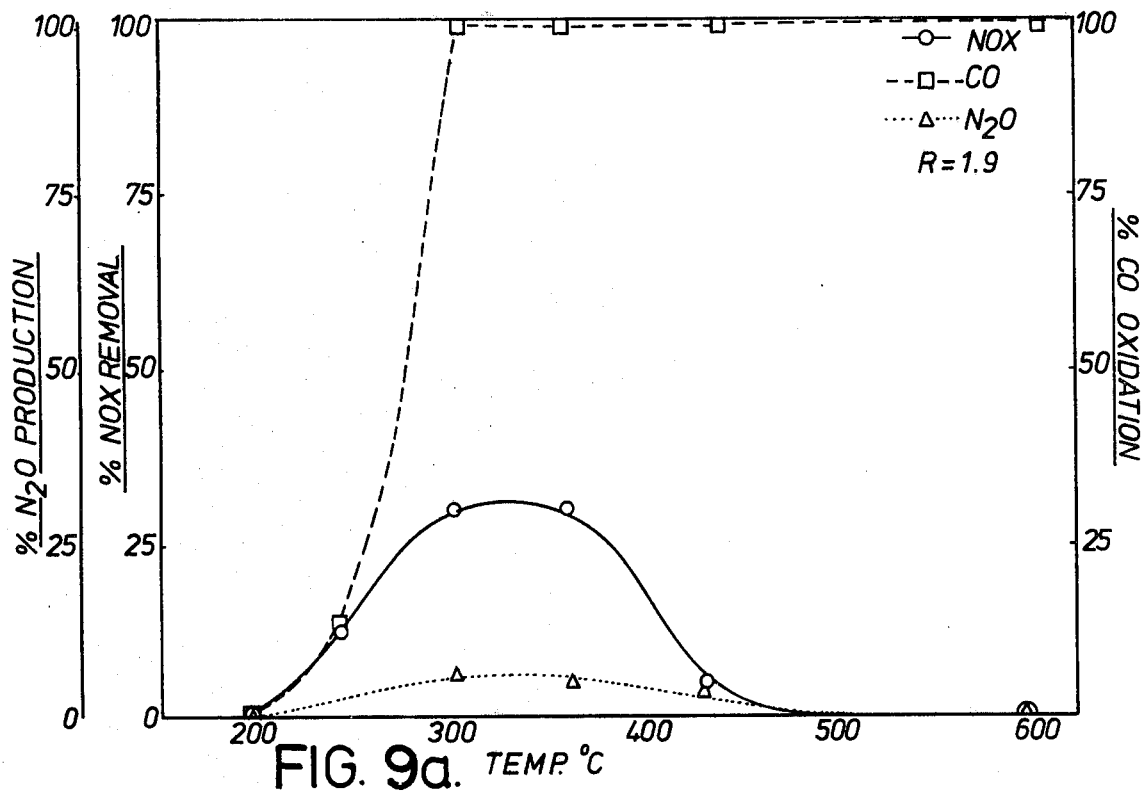
Figure 9B:
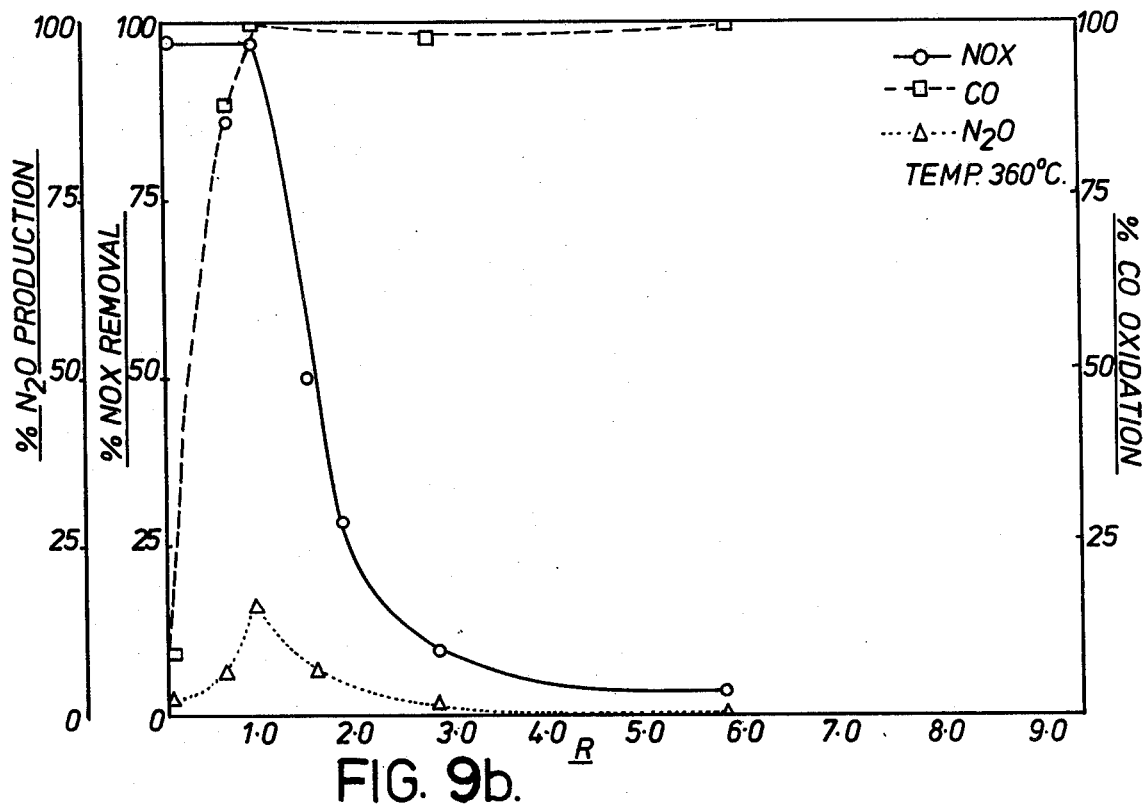

EXAMPLE 9 (FIGS. 9a and 9b)

This catalyst was the platinum analogue of that tested in the previous example and had the formula $La_{0.8}Sr_{0.2}Co_{0.9}Pt_{0.1}O_3$. The isothermal experiment (FIG. 9b) at 360° C. showed extremely good NOx removal under highly reducing conditions (right down to R=0) and reasonable resistance to oxygen poisoning at R=1.

Although specific reference has been made above to the use of Kanthal DSD as the catalyst support, other metallic and non-metallic supports may be used. Another metallic support of particular interest is that sold under the Registered Trade Mark Fecralloy which is described and claimed in British Patent Application No. 22707/73 (U.S. Pat. No. 3,920,583)

We have found that the use of lanthanum rhodite is superior to lanthanum oxide and this is summarised in Table 1. The superiority is also illustrated graphically in FIGS. 10 and 11.

Figure 10:
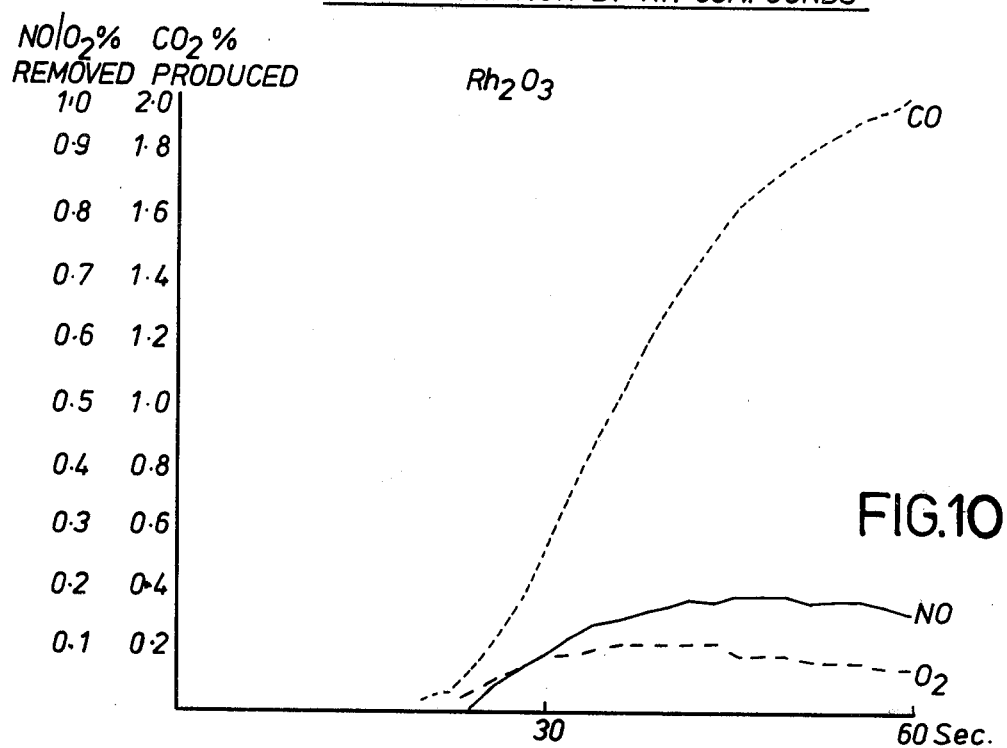
Figure 11:
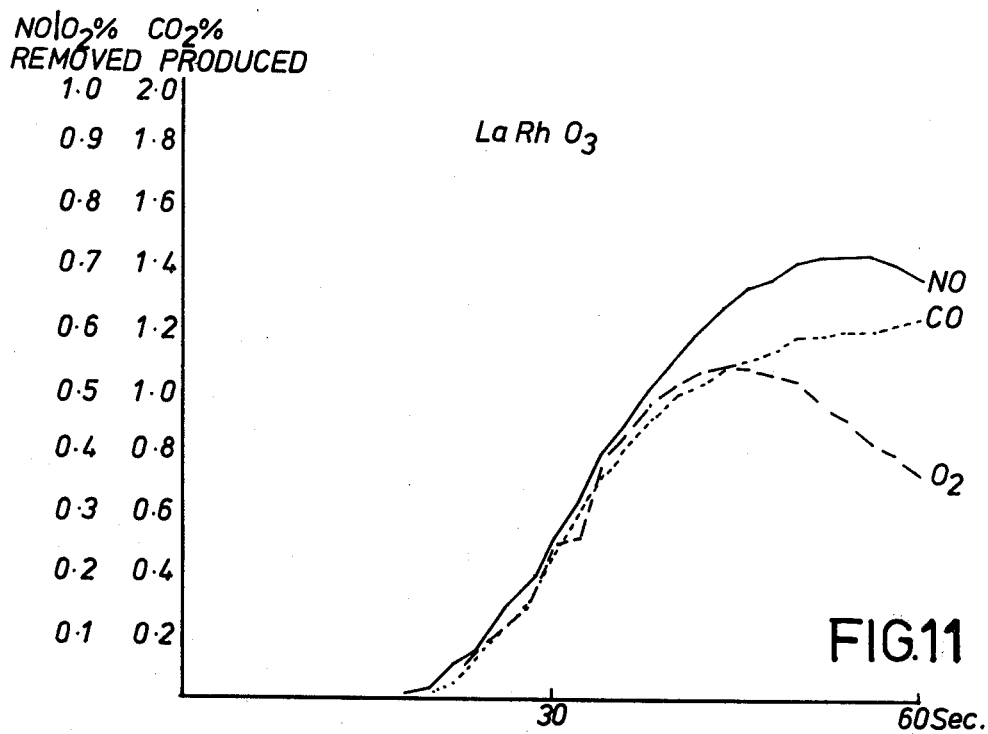

The graphs of FIGS. 10 and 11 and the results given in Table 1 show the relative effectiveness of $Rh_2O_3$ and $LaRhO_3$ for the catalytic oxidation of CO to $CO_2$ and for the catalytic reduction of NO to $N_2$. The tabulated results and graphs also show the readiness with which $Rh_2O_3$ and $LaRhO_3$ will take up oxygen.

The tests were carried out in a vertical reactor vessel in which was located a sintered glass plate upon which a powdered sample of the material under test could be placed. The aim of the tests was to determine the relative readiness with which the two materials will adsorb carbon monoxide, nitric oxide and oxygen in that order. Readiness to adsorb CO was determined by measuring the quantity of $CO_2$ produced when a mixture of CO and helium was passed over a heated sample of the material under test. In the case of the other two gases, the proportion of NO and $O_2$ actually removed from gas streams containing helium and nitric oxide and helium and and oxygen respectively was determined when these gas streams were passed over the heated sample. The carbon dioxide measurement gave a measure of the efficiency of the material in oxidising carbon monoxide; the NO adsorption its readiness to reduce nitrogen oxides to nitrogen and its oxygen adsorption the ease with which it may be re-oxidised in an oxidising environment so as to prepare it to carry out oxidising processes.

TABLE 1.

| | CO, NO and $O_2$ adsorption capacities of $Rh_2O_3$ and $LaRhO_3$ | | |
|---|---|---|---|
| | Volume of gas adsorbed in 1 min/g of Rh | | |
| | CO | NO | $O_2$ |
| $Rh_2O_3$ | 14.7 | 1.71 | 0.98 |
| $LaRhO_3$ | 23.84 | 14.25 | 11.03 |

Initially a blank experiment was carried out on the reactor with nothing on the sintered glass plate. During this experiment the reactor was heated to 500° C. and flushed through with helium gas, following which a gas consisting of 2% of carbon monoxide in helium was passed through the heated reactor tube and the outflow fed to a mass spectrometer where the carbon dioxide content of the outflow was determined over a period of time. Next, the apparatus was again flushed through with helium and then 1% of nitric oxide in helium was passed through it, any reduction in the nitric oxide content in the gaseous outflow being determined by means of a mass spectrometer. Finally, this last stage was repeated using 1% of oxygen in helium (in place of the NO in He) after the reactor apparatus had again been purged with helium, the mass spectrometer on this occasion, of course, being used to determine any reduction in the oxygen content of the outflow from the reactor.

Following this, the procedures of these blank experiments were repeated, firstly with 66 gm of powdered $Rh_2O_3$ and then with 66 gm of powdered $LaRhO_3$ on the sintered glass plate.

The measurements made during these experiments were used to calculate the adsorption capacities of $Rh_2O_3$ and $LaRhO_3$ for CO, NO and $O_2$ respectively in arbitrary units of volume per minute per gram of rhodium. These figures are given in Table 1 where the outstandingly better performance of $LaRhO_3$ compared with that of $Rh_2O_3$ is clearly shown.

The same effect is illustrated in FIGS. 10 and 11 where the percentages of $CO_2$ produced and of NO and $O_2$ removed by 66 gm of $Rh_2O_3$ respectively are plotted against time. In this case, however, the effect is not quite so marked because the proportion of rhodium by weight in a given weight of $LaRhO_3$ is less than half that in the same weight of $Rh_2O_3$.

What we claim is:

1. A catalyst for the purification of an exhaust gas which includes the simultaneous reduction of a nitrogen oxide and the oxidation of carbon monoxide and unreacted hydrocarbon, said catalyst comprising an inert refractory ceramic honeycomb support, an intermediate refractory metal oxide layer on the support to provide a high surface area and a catalytic material deposited on said intermediate refractory metal oxide layer, said material comprising a compound selected from the group consisting of $LaRhO_3$, $MgRh_2O_4$, $Ba_4PtO_6$, $CoAlRhO_4$, $CaPd_3O_4$ and $LaNa_{0.5}Ir_{0.5}O_3$.

2. The catalyst of claim 1 wherein a platinum group metal is also included in the catalytic material.

3. A catalyst for the purification of an exhaust gas which includes the simultaneous reduction of a nitrogen oxide and the oxidation of carbon monoxide and unreacted hyrdocarbon, said catalyst comprising an inert metallic honeycomb support, an intermediate refractory metal oxide layer on the support to provide a high surface area and a catalytic material deposited on said intermediate refractory metal oxide layer, said material comprising a compound selected from the group consisting of $LaRhO_3$, $MgRh_2O_4$, $Ba_4PtO_6$, $CoAlRhO_4$, $CaPd_3O_4$ and $LaNa_{0.5}Ir_{0.5}O_3$.

* * * * *